(12) United States Patent
Altmann et al.

(10) Patent No.: US 11,639,987 B2
(45) Date of Patent: May 2, 2023

(54) AIRBORNE LIDAR PULSE RATE MODULATION

(71) Applicant: LEICA GEOSYSTEMS AG, Heerbrugg (CH)

(72) Inventors: Kristian Altmann, Dornbirn (AT); Andreas Axelsson, Bankeryd (SE)

(73) Assignee: LEICA GEOSYSTEMS AG, Heerbrugg (CH)

(*) Notice: Subject to any disclaimer, the term of this patent is extended or adjusted under 35 U.S.C. 154(b) by 876 days.

(21) Appl. No.: 16/255,502

(22) Filed: Jan. 23, 2019

(65) Prior Publication Data
US 2019/0227149 A1 Jul. 25, 2019

(30) Foreign Application Priority Data

Jan. 24, 2018 (EP) .................................... 18153160

(51) Int. Cl.
*G01S 3/08* (2006.01)
*G01S 7/481* (2006.01)
(Continued)

(52) U.S. Cl.
CPC ............ *G01S 7/4817* (2013.01); *G01S 7/484* (2013.01); *G01S 17/10* (2013.01); *G01S 17/89* (2013.01); *G01S 17/933* (2013.01)

(58) Field of Classification Search
CPC ........ G01S 7/4817; G01S 7/484; G01S 17/10; G01S 17/89; G01S 17/894; G01S 17/933; G01S 7/483
See application file for complete search history.

(56) References Cited

U.S. PATENT DOCUMENTS 8,605,261 B2 * 12/2013 Rindle .................... G01S 17/18
356/3.01
8,681,319 B2 * 3/2014 Tanaka .................... G01S 17/42
356/3.01
(Continued)

FOREIGN PATENT DOCUMENTS

CN 101449181 A 6/2009
CN 101490503 A 7/2009
(Continued)

OTHER PUBLICATIONS

"Simple Electric Motors, Calculations, 2015" (Year: 2015).*
(Continued)

*Primary Examiner* — Samantha K Nickerson
(74) *Attorney, Agent, or Firm* — Maschoff Brennan

(57) ABSTRACT

An airborne laser scanner configured to be arranged on an aircraft for surveying a target along a flight path. The airborne laser scanner comprises an emitter configured for emitting a plurality of consecutive laser pulses towards the ground surface, at least one optical element configured for deflecting the laser pulses along pulse paths towards the target, a motor configured for altering the pulse paths by moving the optical element, a receiver configured for receiving the laser pulses backscattered from the target, and a computer configured for controlling the emitter, the motor, and the receiver, for determining directions of the pulse paths, and for triggering the emitter to emit the laser pulses with a varying pulse spacing based on the directional component of the pulse paths in a horizontal direction perpendicular to a direction of the flight path.

15 Claims, 4 Drawing Sheets

(51) Int. Cl.
  *G01S 17/89* (2020.01)
  *G01S 17/933* (2020.01)
  *G01S 7/484* (2006.01)
  *G01S 17/10* (2020.01)

(56) References Cited

U.S. PATENT DOCUMENTS

| | | |
|---|---|---|
| 2009/0185159 A1 | 7/2009 | Rohner et al. |
| 2009/0279069 A1 | 11/2009 | Jensen et al. |
| 2012/0249996 A1 | 10/2012 | Tanaka et al. |
| 2012/0281200 A1 | 11/2012 | Rindle |
| 2014/0078519 A1* | 3/2014 | Steffey ............ G01S 7/4817 356/625 |
| 2017/0371029 A1* | 12/2017 | Axelsson ............ G01S 17/42 |
| 2019/0219700 A1* | 7/2019 | Coombe ............ G01S 7/003 |

FOREIGN PATENT DOCUMENTS

| | | | |
|---|---|---|---|
| CN | 103076614 A | * | 5/2013 |
| CN | 103076614 B | | 11/2015 |
| CN | 106405527 A | | 2/2017 |
| EP | 3 264 135 A1 | | 1/2018 |
| JP | 2004-226133 A | | 8/2004 |
| JP | 2004226133 A | * | 8/2004 |
| JP | 2006-284204 | | 10/2006 |
| JP | 2006284204 A | * | 10/2006 |
| JP | 2017-015416 A | | 1/2017 |
| JP | 2017015416 A | * | 1/2017 |

OTHER PUBLICATIONS

"Wikipedia, Actuator, Jan. 22, 2018" (Year: 2018).*
"D. Hazry, M. Sofian, and A. Zul Azfar, "Study of Inertial Measurement Unit Sensor", Oct. 2009" (Year: 2009).*
"Wikipedia, Angular velocity, Jan. 5, 2018" (Year: 2018).*
Gatziolis, Demetrios. A guide to LIDAR data acquisition and processing for the forests of the pacific northwest. USDA. General Technical Report PNW-GTR-768. Jul. 2008 (Year: 2008).*
EP Search Report in application No. 18 15 3160 dated Jul. 13, 2018.

* cited by examiner

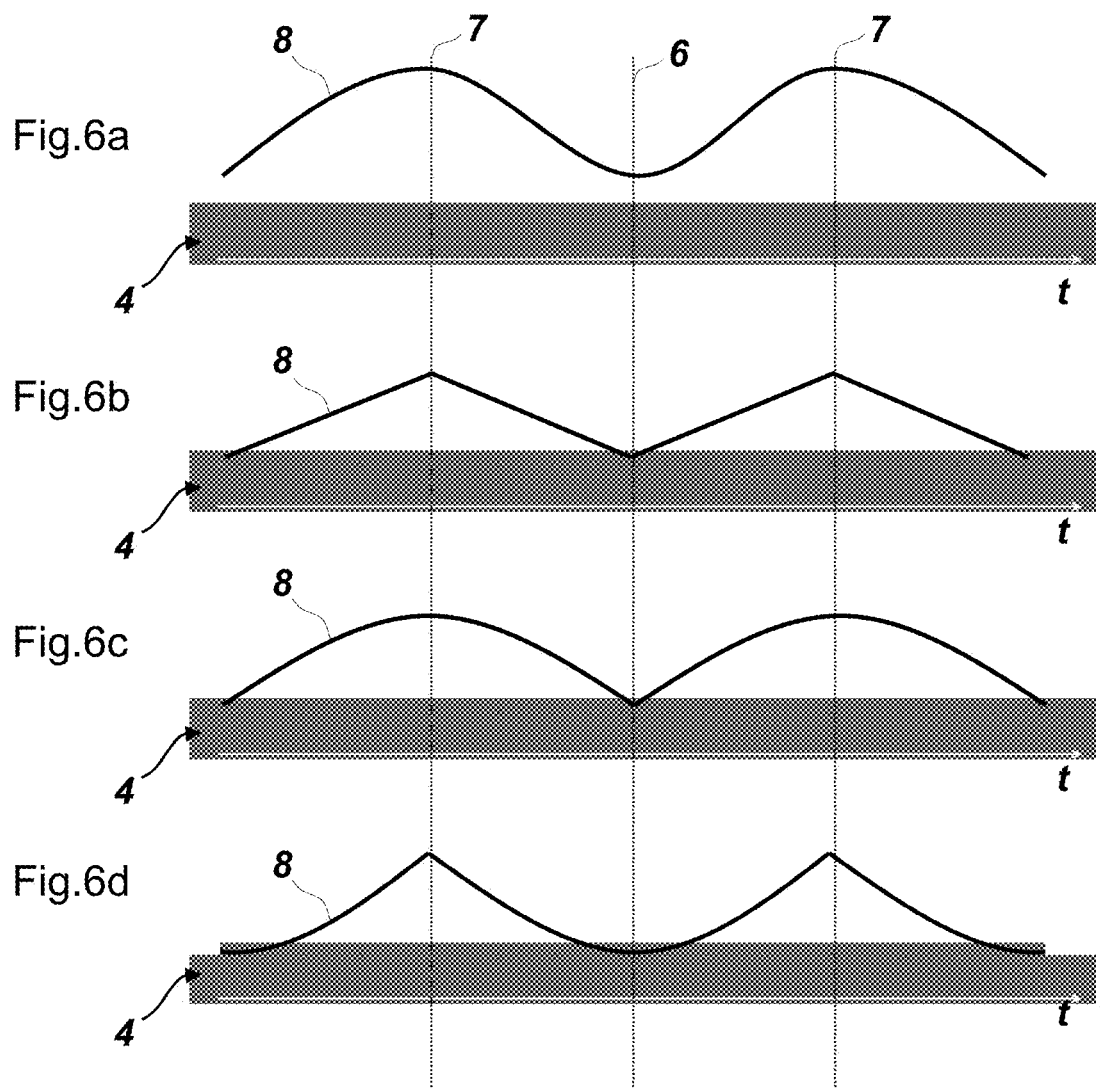

AIRBORNE LIDAR PULSE RATE MODULATION

CROSS-REFERENCE TO RELATED APPLICATIONS

This application claims priority to European Patent Application No. 18153160.9, filed on Jan. 24, 2018. The foregoing patent application are incorporated herein by reference.

FIELD OF INVENTION

The present invention relates to an airborne laser scanner.

BACKGROUND

Scanning a target, such as the ground surface, with a laser range finder for creating 3D point clouds and derivative products is often achieved by moving, in particular rotating or oscillating an optical element such as a mirror, wedge or prism.

This type of scanning usually results in a point distribution that varies over the swath of the scan. The uneven point density may affect the quality of the end product. Also, there may be a scanned region having an unnecessarily high point density resulting in waste of data memory space. For an oscillating or rotating scan there will be a significant pile-up of points at the edges of the swath.

Many LIDAR data filter algorithms and filters depend on a certain point distribution to work optimally.

Also the pile-up of pulses will generate a lot of laser pulses ending up overlapping each other. In terms of eye-safety this means all the overlapping pulses need to be considered when computing the maximum permissible emission of the laser system.

BRIEF DESCRIPTION

Therefore, the present invention aims at providing an improved airborne laser scanner that allows surveying a target with a more even measuring point distribution.

This aim is achieved by modulating the pulse rate of the laser in such a way that the variation of density, as well as the pile-up effect on the edges are minimised.

In an embodiment of some embodiments of the invention the laser of the airborne scanner is configured to emit pulses on demand, in particular with nearly constant pulse energy causing the amplitude of the emitted pulses to be independent of the repetition rate. Generic fibre lasers usually have a pulse energy that can vary significantly with change in pulse repetition rate.

Fibre lasers known from prior art are usually configured to only regulate the average emitted optical power by the current driven into the pump diodes. The pulse energy is proportional to the average power divided by the pulse rate. So if the pulse rate changes while the average power is constant, the pulse energy increases with decreasing pulse rate and vice versa.

In order to emit pulses on demand with a constant energy the laser has to track the applied pulse rate and adjust the average power accordingly in real time. This way, the average optical power varies as a function of the applied pulse rate but the energy contained in each emitted laser pulse is kept at a constant level.

One principle of the invention is to generate the trigger signal for the laser depending at least on the position, in particular and the orientation, of the scanning device. By applying such a trigger pattern one can achieve a larger temporal spacing of the pulses at the edges of the swath which causes a point density similar to the central part of the swath. This results in a more even spatial distribution of the laser pulses.

By generating the trigger as a function of the scan position, pulses for consecutive scans will line up better and give a cleaner and more homogeneous point distribution.

In addition, the lower pulse rate at the edges of the swath reduces the number of pulses that end up at the same geographical location, thus the eye-safety is improved. This allows for a less harmful operation of the scanning device for observers on the ground and for a higher peak power of the laser itself.

In one embodiment, the laser is completely disabled during the edge region of the scanning area to reduce the number of pulses piling up to zero there. As the scan is moving more or less in the direction of the flight, the effective swath width will only slightly be reduced.

In a further embodiment, the scanner position may be not available in real time, or not available at a desired rate. The trigger events may then be generated as a time series (not evenly distributed) that is kept synchronised with the scanner movements. At least the eye safety issue can be handled with similar performance as if using the scanner position directly. The point distribution performance is generally more critical since it depends on placing each individual shot accurately in relation to its surrounding. This embodiment would require very strict time synchronisation.

Summarised, some embodiments of the invention solve the problem of a non-uniform point distribution on the target surface, improves the eye-safety conditions, allows for higher laser power and thus increases both the signal to noise ratio (SNR) and overall sensitivity of the scanning device.

At least one of these improvements is achieved by the airborne laser scanner according to claim 1 and/or the dependent claims of the present invention.

Some aspects of the invention relate to an airborne laser scanner configured to be arranged on an aircraft for surveying a target along a flight path, wherein the airborne laser scanner comprises an emitter configured for emitting a plurality of consecutive laser pulses towards the ground surface, at least one optical element configured for deflecting the laser pulses along pulse paths towards the target, a motor configured for altering the pulse paths by moving the optical element, a receiver configured for receiving the laser pulses backscattered from the target, and a computer configured for controlling the emitter, the motor, and the receiver, for determining directions of the pulse paths, and for triggering the emitter to emit the laser pulses with a varying pulse spacing based on the directional component of the pulse paths in a horizontal direction perpendicular to a direction of the flight path.

In particular, the computer may be configured for determining distances from the airborne laser scanner to the target based on emitted and received laser pulses. In particular, the determining of distances from the airborne laser scanner to the ground surface may be based on the time of flight of the emitted and received laser pulses. In particular, the computer may further be configured for generating a three-dimensional point cloud based on the distances and the directions. In particular, the flight path may be considered a direction of travel of the laser scanner.

The pulse spacing may be gradually varied between a minimum pulse spacing and a maximum pulse spacing, wherein the minimum pulse spacing is set when the directional component is minimal, and the maximum pulse spacing is set when the directional component is maximal.

The pulse spacing may be gradually varied according to a sinusoidal characteristic, a linear zig-zag characteristic, a wave characteristic, a saw tooth characteristic, or a step characteristic. In particular, the characteristic of the pulse spacing can have a characteristic being any combination of said optional characteristics.

In particular, increasing the pulse spacing is equivalent with decreasing a pulse rate.

The optical element may for example be a prism or a mirror. A prism may be any type of prism, for example a wedge prism.

The motor may be configured for rotating the optical element around a rotation axis, resulting in a cone-shaped laser pulse emission pattern. This rotation may be performed continuously, i.e. infinite, or the rotation direction may reverse at a reverse position resulting in a half-cone-shaped pulse emission pattern.

The airborne laser scanner according to an embodiment of the invention comprises an angle encoder configured for providing positions of the optical element. Said positions of the optical element are in particular rotational positions or angular positions respectively. In particular, the directional components of the pulse paths in a horizontal direction perpendicular to a direction of the flight path can be derived from the positions of the optical element.

The motor may be configured for oscillating the optical element around an oscillation axis, resulting in a fan-shaped laser pulse emission pattern.

The airborne laser scanner according to an embodiment of the invention comprises an oscillation sensor configured for providing positions of the optical element.

The computer may be configured for calculating a time-based sequence of the varying pulse spacings. Said sequence can be applied without a real-time determination of the deflection direction. However, in this case, the applied sequence should be synchronised with the rotation or oscillation of the optical element.

The optical element may be arranged relative to the emitter in such a way that the optical element deflects the laser pulses in a defined constant angle relative to the rotation axis or the oscillation axis.

The computer may be configured for determining a current of the motor, and determining the directions of the pulse paths based on the current. In particular, also the defined constant angle is taken into account when determining the directions of the pulse paths.

The computer may also be configured for receiving flight data from the aircraft, wherein the flight data may comprise a direction of the flight path of the aircraft. In particular, the flight data are time-based GNSS-signals.

One embodiment of the airborne laser scanner comprises an Inertial Measuring Unit (IMU), wherein the computer may be configured for receiving heading data from the IMU and determining a direction of the flight path based on the heading data.

The computer and the emitter may be configured for providing the laser pulses with constant pulse energy. Constant pulse energy is to be understood as at least essentially the same pulse energy, e.g. granting a 10% tolerance for such restriction.

The optical element may be configured for deflecting the laser pulses backscattered from the target towards the receiver.

DESCRIPTION OF THE DRAWINGS

In the following, the invention will be described in detail by referring to exemplary embodiments that are accompanied by figures, in which:

FIG. 6a-d: show four graphs of embodiments of the pulse modulation according to the invention;

DETAILED DESCRIPTION

Figure 1:
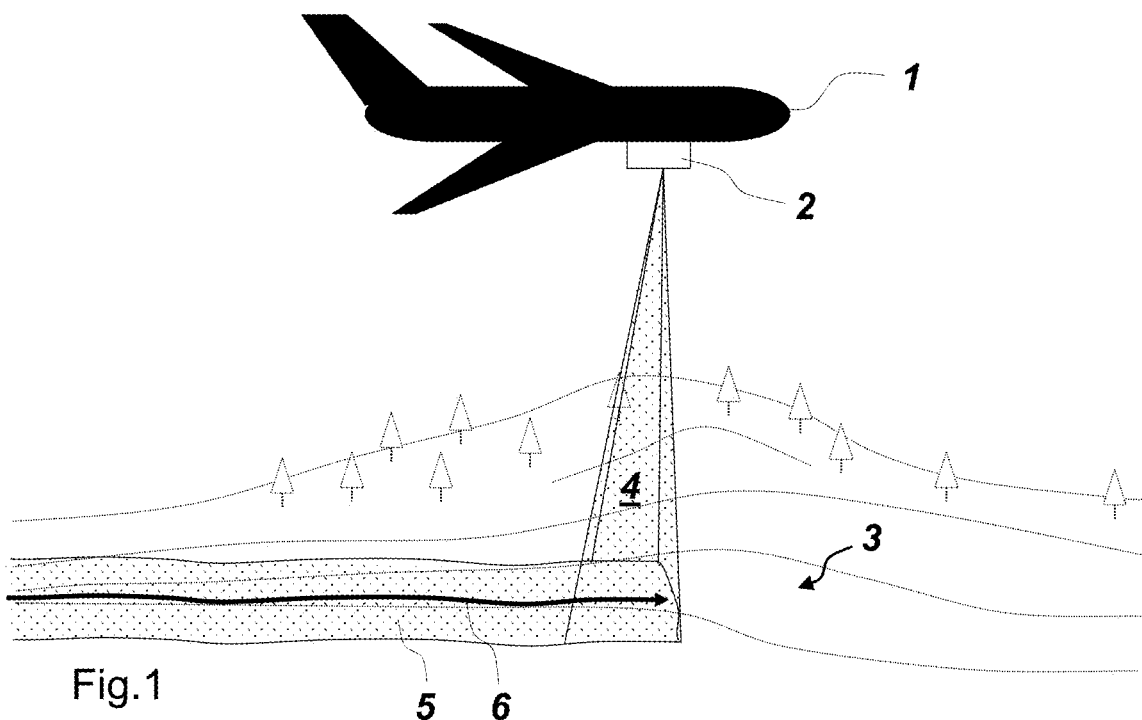
FIG. 1: shows an aircraft flying over a ground surface (target), a flight path (trajectory) of the aircraft, an airborne laser scanner according to the invention arranged on the aircraft, a point cloud of the swath of the aircraft generated by the airborne laser scanner, and laser pulses emitted by the airborne laser scanner.

FIG. 1 shows an aircraft 1 flying over a ground surface as target 3, a flight path 6 (trajectory) of the aircraft 1, an airborne laser scanner 2 according to the invention arranged on the aircraft 1, laser pulses 4 emitted by the airborne laser scanner 1, and a point cloud 5 of the swath of the aircraft 1 generated based on said laser pulses. The laser pulse emission pattern 4 is symbolically shown as a pyramid. In reality however it rather appears as a cone or fan.

Figure 2A:
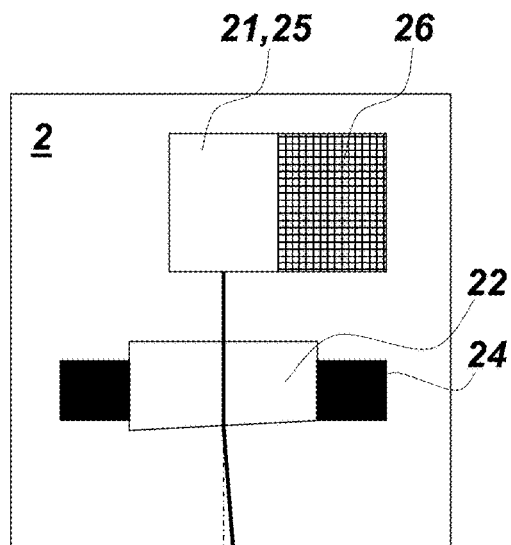
FIG. 2a,b: show two embodiments of the airborne laser scanner.
Figure 2B:
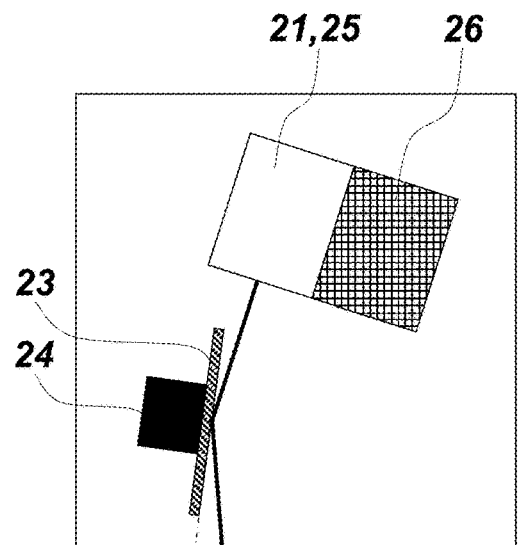

FIGS. 2a and 2b each symbolically show an embodiment of an airborne laser scanner 2 according to the invention. FIG. 2a shows the airborne laser scanner 2 comprising a computer 26, an emitter 21 and a receiver 25, which in this example are combined in one unit, but may however also be arranged separately. A prism 22, in particular a wedge prism, as optical element is in operative connection with a motor 24, such that it is rotatable around the rotation axis R. The movement of the optical element 22 induced by the motor may be a continuous or a partial rotatory movement. A continuous rotatory movement is to be understood as at least one full 360°-rotation, in particular a permanent sequence of full rotations, and a partial rotatory movement is to be understood as a rotation, in particular a rotation of less than 360°, which is reversed in a defined scheme. For example, after a 180°-rotation, the motor changes the rotational direction and goes back the 180°, and so on.

During the movement of the optical element 22, the emitter 21 emits a plurality of consecutive laser pulses 211 towards the target. The pulse path is altered by the movement of the optical element. The pulses 251 backscattered from the target are received by the receiver 25.

The computer 26 is connected to the emitter 21, the receiver 25, and the motor 24, and it is configured for controlling these components.

In an embodiment, the computer 26 may additionally be configured for determining a distance from the airborne laser scanner to the ground surface for emitted and received laser pulses based on the time of flight method. Since the angle by which the optical element is deflecting the pulses and the direction of the pulse path are known and/or determinable (e.g. by an angle encoder), the TOF-distance value can be associated to the direction (e.g. at least one coordinate such as angle(s)) of the current pulse path at a specific measurement time.

Particularly, a three-dimensional point cloud based on these associations (point measurements) can be generated by an external computer in a post-processing. In this case, the internal computer 26 is merely configured to collect the data. The data may comprise time stamps of pulse transmission and pulse reception or distance values already calculated by means of said stamps, and transmission/reception direction.

Alternatively, the computer 26 can be configured for generating said point cloud, in particular in real-time.

According to the invention, the laser pulses (or respectively: the laser pulse rate, or the laser pulse spacings) are modulated based on the directional component of the current pulse path in a horizontal direction perpendicular to a direction of the flight path.

The invention allows generating a point cloud which has a more steady (or: even) point distribution and which has less point cluster.

A second embodiment of the airborne laser scanner 2 is shown in FIG. 2b, wherein the construction is similar to the one shown in FIG. 2a but the optical element is a mirror 23 instead of a prism. Also, the motor 24 does not perform full rotations as positioning, but performs oscillations around an oscillation axis O. In particular, the oscillation axis runs along (or: parallel to) the surface of the mirror. The oscillation axis can however also run elsewhere. In particular, the oscillation can also be understood as a partial rotatory movement.

By the oscillating positioning of the mirror 23, the emitted laser pulses 211 are deflected towards the target and back along a pulse path. Said pulse path pivots laterally to the flight path.

Figure 3A:
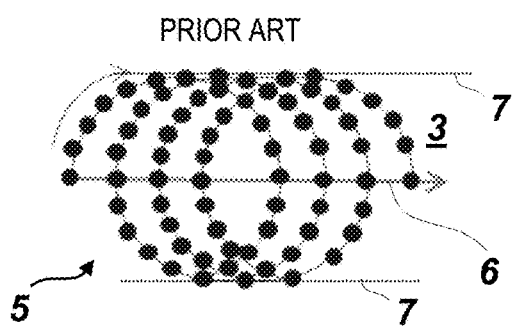
FIG. 3a,b: show the point clouds of two exemplary laser pulse emission patterns according to prior art.
Figure 3B:
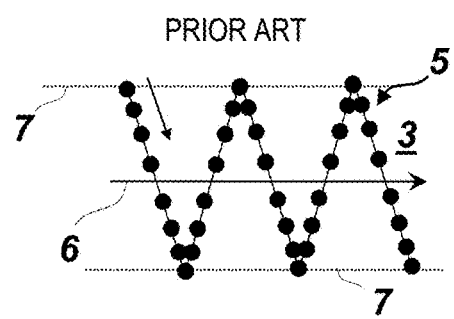

FIGS. 3a and 3b show the unfavourable point distribution in point clouds 5 of two exemplary laser pulse emission patterns according to prior art. The paper plane is the ground surface 3. These point clouds 5 have been generated by laser pulses which have been emitted at a constant pulse rate or constant pulse spacing. It can be recognised that the point density in the area of a reverse position 7 of the motor is relatively high compared to the area between the reverse positions 7. At this reverse position 7 the directional component of the pulse path in a horizontal direction perpendicular to a direction of the flight path is maximal.

The pattern of FIG. 3a corresponds to a laser scanner of FIG. 2a, wherein continuous full rotations are performed while the aircraft is moving along a flight path 6.

The pattern of FIG. 3b corresponds to a laser scanner of FIG. 2b, wherein the motor oscillates the mirror within the reverse positions 7 while the aircraft is moving along a flight path 6.

The reverse position may in some embodiments also be defined as a position of the motor in which a laser pulse is deflected by the optical element at the largest angle with respect to a plumb-line of the aircraft and in a plane perpendicular to a flight path of the aircraft. In other words, in the reverse position of the motor, an emitted laser pulse measures the fringe of the swath of the scanner, i.e. the most lateral areas with respect to the trajectory of the aircraft. At this reverse position, the motor reverses the deflection to the respective other direction (towards the other edge of the swath) with respect to an axis perpendicular to the flight path 6 in FIGS. 3a and 3b.

Figure 4A:
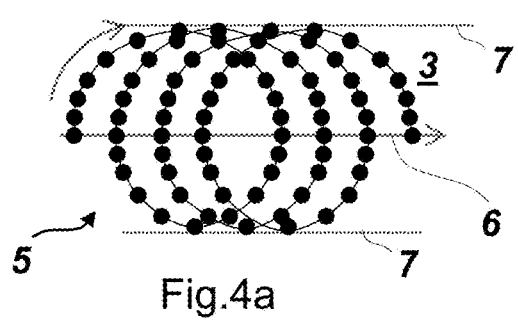
FIG. 4a,b: show the point clouds of two exemplary laser pulse emission patterns according to the invention.
Figure 4B:
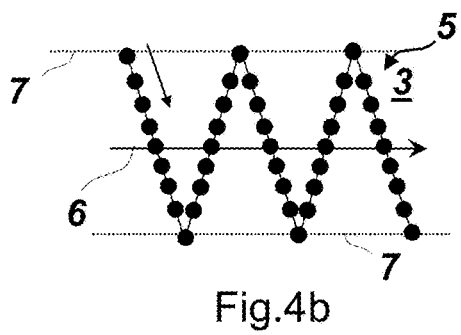

FIGS. 4a and 4b show the result of pulse modulation according to the invention. The larger the direction component of the pulse path in a horizontal direction perpendicular to a direction of the flight path 6, the larger the pulse spacing is. In other words, the closer the points of the cloud 5 are to the reverse lines 7, the lower the pulse rate is. Accordingly, a more even point distribution is achieved.

Figure 5A:
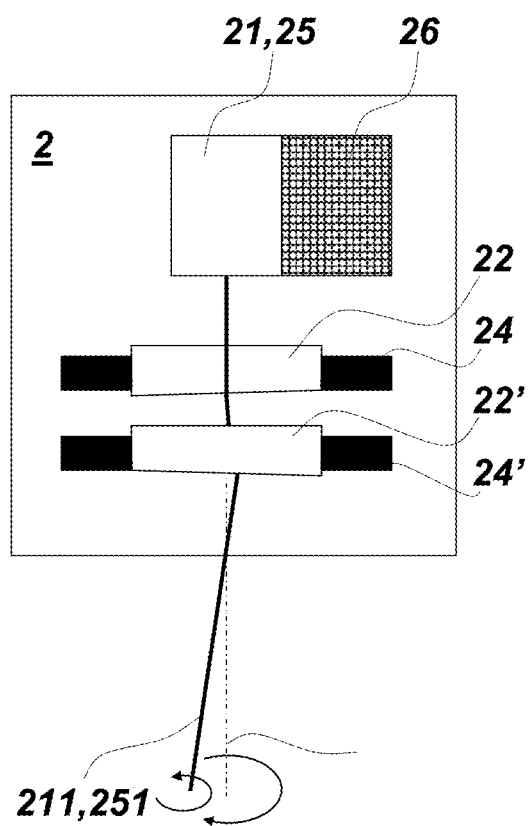
FIG. 5a,b: show two further embodiments of the airborne laser scanner.

In further embodiments, an airborne scanner according to the invention can achieve various scan patterns. FIG. 5a shows a double prism arrangement configured to deflect the laser path twice—once by the prism 22 and once by the prism 22'. Both prisms may be motorised by motor 24 and motor 24' respectively. In particular, said motors are configured for rotating the prisms in opposite directions.

Figure 5B:
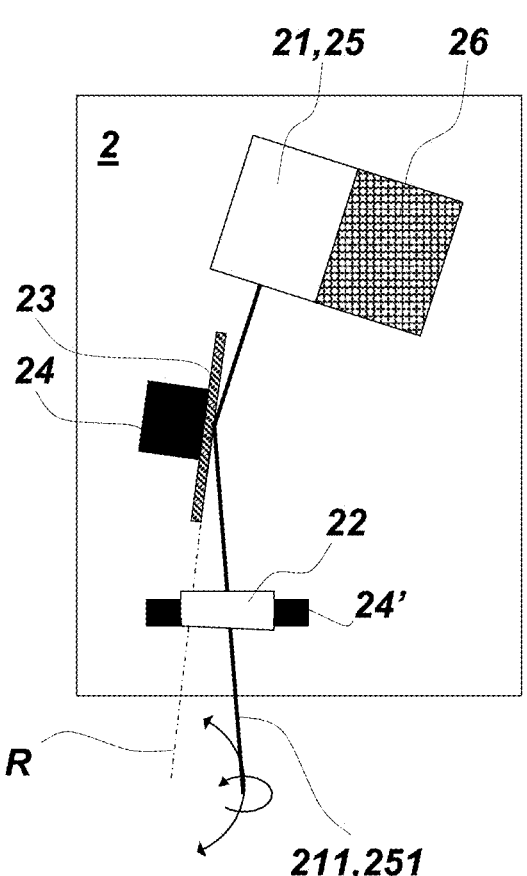

FIG. 5b shows a double optical element arrangement configured to deflect the laser path twice—once by the mirror 23 and once by the prism 22. Both the mirror 23 and the prism 22 may be motorised by motors 24 and 24'. The oscillation of the mirror 23 may be superimposed by the rotation of the prism 22.

Possible scan patterns resulting from the arrangements shown in FIGS. 5a and 5b (or other combinations of mirrors and/or prisms) may have the shape of a flower or a spiral following a zigzag path. By varying the respective rotation/oscillation speeds and/or directions, various different patterns are achievable.

Be the pattern as it may, according to the invention, the pulse rate is decreased the more the pulses approach the reverse lines 7, or in other words, the more the pulse paths are directed towards the edges of the swath.

FIGS. 6a, 6b, 6c, and 6d each show exemplary pulse modulations provided by the computer to the emitter. The modulations all have in common that they are depending on the pulse path direction.

If the lateral (relative to the flight direction) component of the pulse path direction reaches a maximum, i.e. the laser pulses arrive at a reverse position 7, the pulse spacing 8 reaches its maximum (or respectively: the pulse rate has a minimum).

Accordingly, if the motor reaches a position so as to send a laser pulse at the smallest angle, in particular 0°, with respect to a plumb-line of the aircraft and in a plane perpendicular to a flight path of the aircraft, the pulse spacing 8 reaches its minimum (or respectively: the pulse rate reaches its maximum). In this case, the laser pulse is directed essentially onto the flight path 6 on the ground surface, i.e. said directional component of the pulse paths in a horizontal direction perpendicular to a direction of the flight path is minimal, in particular zero.

The pulse spacing may be gradually varied according to a sinusoidal characteristic (FIG. 6a), a linear zig-zag characteristic (FIG. 6b), a wave characteristic (FIG. 6c), or a saw tooth characteristic (FIG. 6d). In another embodiment (not shown), the pulse spacing is varied according to a step characteristic, wherein the pulse spacing is kept constant for a step period and then jumps up step by step. In particular, any combination of the above mentioned pulse sequences may be applied.

The sequences of pulses 4 indicated by the arrows in FIGS. 6a-d are qualitative illustrations. In fact, the sequences of pulses 4 differ slightly based on the according pulse spacing characteristic 8. Said courses of pulse spacings 8 are also to be understood as qualitative illustrations, which may appear exaggerated. However, the graphs 8 are intended to show that there may be various optional mathematical principles behind the way the pulses are modulated according to the invention.

Although the invention is illustrated above, partly with reference to some preferred embodiments, it must be understood that numerous modifications and combinations of different features of the embodiments can be made. All of these modifications lie within the scope of the appended claims.

What is claimed is:

1. An airborne laser scanner configured to be arranged on an aircraft for surveying a ground surface along a flight path of the aircraft, wherein the airborne laser scanner comprises:
   an emitter configured for emitting a plurality of consecutive laser pulses towards the ground surface from the aircraft;
   at least one optical element configured for deflecting the laser pulses along pulse paths towards the ground surface;
   a motor configured for altering the pulse paths by moving the optical element;
   a receiver configured for receiving the laser pulses backscattered from the ground surface toward the aircraft; and
   a computer configured for:
      controlling the emitter, the motor, and the receiver,
      collecting time stamps of the emitted laser pulses from the aircraft and the received laser pulses from the ground or collecting distance values calculated based on time stamps of the emitted laser pulses from the aircraft and the received laser pulses from the ground, and
      determining directions of the pulse paths,
   wherein:
      surveying the ground surface is for generating a three-dimensional point cloud based on the time stamps and on the directions of the pulse paths,
      the computer is configured for triggering the emitter to emit the laser pulses with a varying pulse spacing based on the directional components of the pulse paths in a horizontal direction perpendicular to a direction of the flight path.

2. The airborne laser scanner according to claim 1, wherein the pulse spacing is gradually varied between a minimum pulse spacing and a maximum pulse spacing, and wherein:
   the minimum pulse spacing is set when the directional component is minimal, and
   the maximum pulse spacing is set when the directional component is maximal.

3. The airborne laser scanner according claim 1, wherein the pulse spacing is gradually varied according to a sinusoidal characteristic, a linear zig-zag characteristic, a wave characteristic, a saw tooth characteristic, a step characteristic, or any combination of said characteristics.

4. The airborne laser scanner according to claim 1, wherein the optical element is a prism or a mirror.

5. The airborne laser scanner according to claim 1, wherein the motor is configured for rotating the optical element around a rotation axis, resulting in a cone-shaped laser pulse emission pattern.

6. The airborne laser scanner according to claim 5, wherein the optical element is arranged relative to the emitter in such a way that the optical element deflects the laser pulses in a defined constant angle relative to the rotation axis or relative to the oscillation axis.

7. The airborne laser scanner according to claim 1, further comprising an angle encoder configured for providing positions of the optical element.

8. The airborne laser scanner according to claim 1, wherein the motor is configured for oscillating the optical element around an oscillation axis, resulting in a fan-shaped laser pulse emission pattern.

9. The airborne laser scanner according to claim 8, further comprising an oscillation sensor configured for providing positions of the optical element around the oscillation axis.

10. The airborne laser scanner according to claim 1, wherein the computer is configured for calculating a time-based sequence of the varying pulse spacings of the laser pulses to be emitted from the emitter.

11. The airborne laser scanner according to claim 1, wherein the computer is further configured for:
   determining a current of the motor, and
   determining the directions of the pulse paths based on the current.

12. The airborne laser scanner according to claim 1, wherein the computer is further configured for receiving flight data from the aircraft, said flight data comprising a direction of the flight path of the aircraft.

13. The airborne laser scanner according to claim 1, further comprising an Inertial Measuring Unit (EV1U), wherein the computer is further configured for receiving heading data from the EVIU and for determining a direction of the flight path based on said heading data.

14. The airborne laser scanner according to claim 1, wherein the computer and the emitter are further configured for providing the laser pulses with constant pulse energy.

15. The airborne laser scanner according to claim 1, wherein the optical element is further configured for deflecting the laser pulses backscattered from the ground surface towards the receiver.

* * * * *